Figure 1:
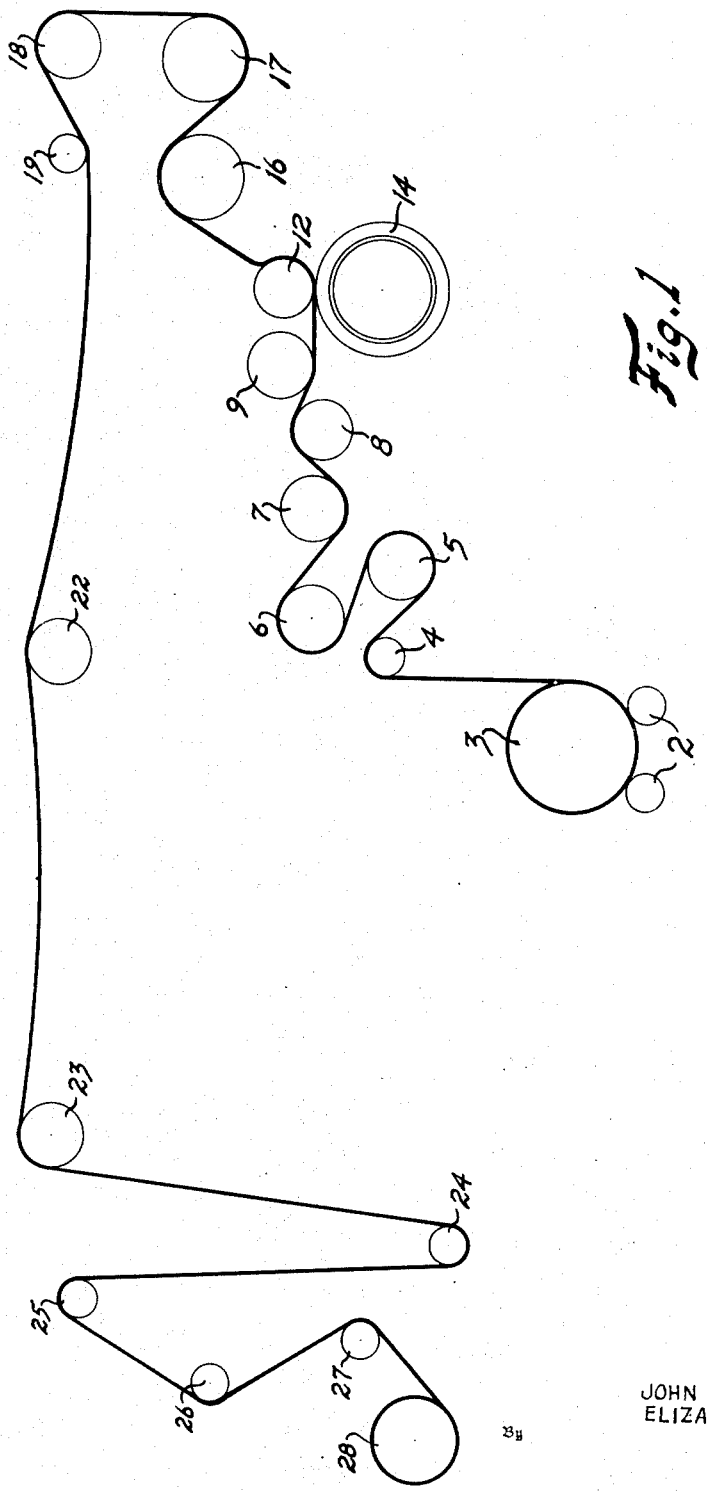

Sept. 21, 1954  J. MUTH, SR., ET AL  2,689,378
PROCESS FOR EMBOSSING PLASTIC SHEET MATERIALS
Filed March 10, 1951  2 Sheets-Sheet 2

Inventors
JOHN MUTH, SR.,
DECEASED, BY ELIZABETH
MUTH, EXECUTRIX

Attorney

Patented Sept. 21, 1954

2,689,378

UNITED STATES PATENT OFFICE 2,689,378

PROCESS FOR EMBOSSING PLASTIC SHEET MATERIALS

John Muth, Sr., deceased, late of Brooklyn, N. Y., by Elizabeth Muth, executrix, Brooklyn, N. Y., and W. Gerald Clarry, Brooklyn, N. Y.

Application March 10, 1951, Serial No. 219,416

5 Claims. (Cl. 18—47.5)

The invention here disclosed is a process for the manufacture of embossed plastic films by a heat and pressure procedure in which a sheet of smooth surface plastic is heated to a moderately elevated temperature and then pressed against a cold engraved or intaglio roll by a soft roll to emboss a pattern on one surface of the sheet plastic while smoothing or modifying the reverse surface.

The newer thermoplastic polymers, especially the vinyl type of thermoplastic polymers, have been found to be easily rolled out into thin sheets ranging in thickness from 40 or 50 mils (thousandths of one inch) down to 3 or even 2 mils thickness and in some instances even thinner. These plastic sheets have been prepared in a wide range of colors and in this form they are articles of commercial sale and are used for many purposes. However, they obviously are not woven fabrics since there is no texture on either side and the lack of texture causes them to drape poorly and to have a rather poor "hand" and an unsatisfactory feel to a user. These characteristics have resulted in a much lower sale of the polymer sheet material than would be expected because of the fact that the materials have not been acceptable to many users who might have been expected to find them very useful.

According to the present invention it is now found that the draping properties, the "hand," and the feel of the sheet plastics can be very greatly modified, to a condition different in order of magnitude, by embossing upon one or both surfaces of the plastic sheet a pattern or design which may simulate a woven pattern. This pattern may simulate the simple square weave or may simulate a serge weave, or may simulate any of a wide range of Jacquard loom patterns, or may depart from conventional woven surface effects into a wide range of pattern designs having little or no relationship to weaving patterns. It is found that a satisfactory embossed pattern cannot be obtained upon these plastics by any direct pressure procedure. This is due to the fact that the material is not truly plastic but has a considerable elasticity in the cold. Also, at elevated temperatures it tends to melt, wrinkle, and flow, and is generally difficult to handle.

According to the present invention it is found that, when the sheet plastic has been warmed or heated to a critical temperature, a few degrees below its softening point, it can be pressed against a cold engraved surface by another roll, preferably a soft roll which usually is best made with a fairly stiff outer layer, preferably a rubber material such as tire tread stock. The warm plastic sheet will flow sufficiently under the roll pressure to conform to the engraving on the surface of the cold hard roll from which it may be stripped, cooled, and re-reeled.

Figure 2:
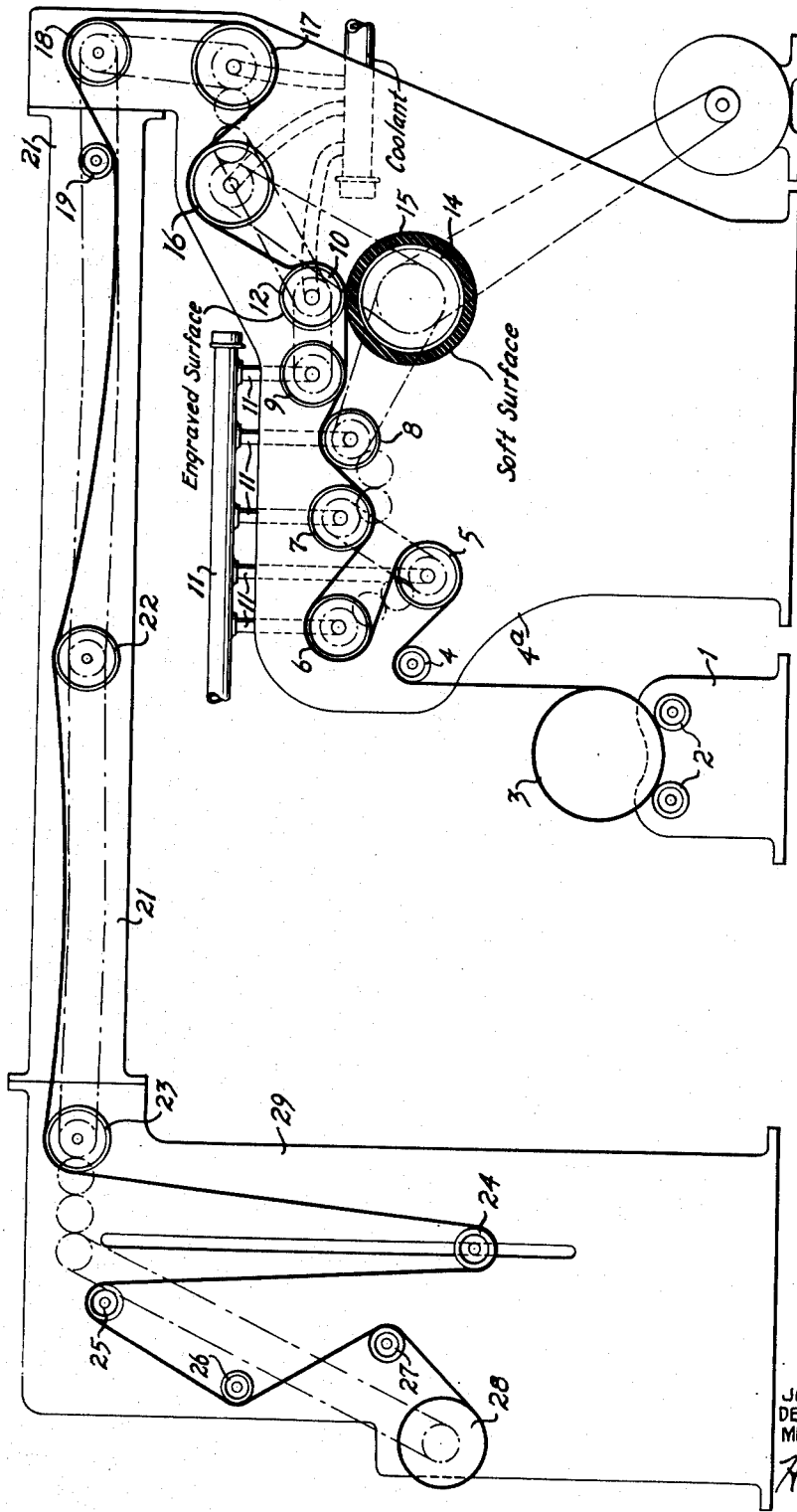

Thus, the process of the invention warms a sheet of thermoplastic material to a point just below the softening temperature, stretches it slightly to insure a smooth, even, uniform surface, presses the hot stretched plastic sheet against a cold engraved roll by a second roll, which is preferably a soft roll but which, if desired, may be a second engraved roll, causes the strip of plastic to follow the cold roll for a portion of a revolution, then strips the plastic sheet from the cold engraved roll, cools the sheet to room temperature, and re-reels the sheet, using a plurality of vertically displaced heating rollers preferably heated by steam or by hot oil, or by small gas flames, or by any other convenient heating means, each roll being positively driven and successive rolls being slightly larger in diameter, or having a slightly higher peripheral speed to give the desired stretching effect, the warmed plastic sheet being delivered from the last heating roll directly to the bite between an engraved roll and a second roll whereby the pattern of the engraved roll is forced into the surface of the warm plastic sheet and the sheet is simultaneously chilled to hold on it the surface modification produced by the engraved roll, the plastic sheet being allowed to follow the engraved roll for about one-quarter revolution to insure firm setting of the pattern into the plastic sheet surface, after which the plastic sheet is cooled and re-reeled on a variable take-up reel. Other objects and details of the invention will be apparent from the following description when read in connection with the accompanying drawings, in which Fig. 1 is a flow diagram of the process, and Fig. 2 is a diagrammatic view in vertical section of the apparatus by which the process may be carried out.

The apparatus consists of a pair of frame members 1, only one being shown, upon which there are mounted a pair of carrier rolls 2. The roll of smooth sided plastic material 3 is laid loosely upon the rolls 2 so that it will unroll easily to feed the sheet of plastic to the embossing mechanism. Above the carrier rolls 2 there is mounted a feed roll 4 which is carried in a main frame 5. Adjacent the said roll 4 there are positioned a series of heater rolls 5, 6, 7, 8, and 9. Each of these successive rolls 4 to 9, inclusive, is positively driven, preferably by a gear train which may conveniently be located outside of the bearings in the frame 5 in which the rolls are carried (alternatively the rolls may be driven by any convenient type of chain drive, or even by belt drive if desired although belt slippage complicates the operating problems). The gear ratio and diameter of the rolls are adjusted in such a way that the peripheral speed increases with successive rolls to give the desired amount of stretch. The rolls may conveniently be heated by steam supplied through pipe gland lead members 11. However, almost any desired heating method may be used. Hot oil is very satisfactory; small gas flames from a pipe burner also will serve excellently.

There is also provided an engraved embossing roll 12 similarly carried in bearings in the main frame 5 and driven by the same gear train or chain. Below the engraved roll 12 there is mounted a pressure roll 14.

The roll member 12 is preferably cooled by a small stream of cold water, supplied through gland leads 10, to a temperature of about 100° F., usually within the range between about 90° F. and 130° F. The amount of heat to be removed from it is relatively very small, since the thermal capacity of the plastic sheet is small both because of its thinness and because of its low thermal capacity so that only a small portion of the heat input into the heating rolls appears as heat to be removed from the embossing roll.

The roll 14 may be a pressure roll, in which case it is preferably covered with a layer of soft material 15 which may conveniently be rubber of about the texture of a medium grade of tire tread stock. Alternatively, the roll 14 may also be engraved to put an engraved pattern on both sides of the sheet. However, for most uses to which the sheet of plastic will be put, this is neither necessary nor desirable, and it is considerably more difficult to emboss both sides of the sheet than to emboss one side only. This appears to be due to the fact that optimum embossing character is obtained by allowing the embossed sheet to adhere to the embossing roll for one-quarter to one-third of the periphery of the embossing roll, and this cannot be done for two simultaneously acting embossing rolls.

Alternatively, the pressure roll 14 may be made of compressed paper, although this makes a harder surface roll, which must be "run in" against the engraved roll for a time before satisfactory embossing is obtained. Also, the roll 14 may have a pattern of its own. For the making of material to imitate "crepe" there is required not only the surface embossing but also a deeper cutting to give the "crepe" pattern. For this type, the roll 14 usually has its own pattern to force the sheet of plastic into the deeper "crepe" pattern.

Above and beyond the embossing roll 12 there are also provided take-off rolls 16 and 17 over which the embossed film travels for cooling. These rolls may also be water cooled if desired but this usually is not necessary. Likewise the roll 14 does not need to be water cooled (in part because of the low heat transmission of the soft covering 15).

Above the roll 17 there is provided a roll 18 followed by a roll 19 mounted in an auxiliary frame member 21. At a substantial distance from the roll 19 there are provided support rolls 22 and 23 over which the embossed plastic film passes for final cooling. Below the roll 23 there is then provided a floating take-up roll 24 under which the film passes and above which there are located a series of rolls 25, 26, and 27 for delivery of the embossed film to a take-up reel 28 upon which the finished embossed film is wound.

These various rolls are conveniently mounted in any suitable frame as shown, preferably in three or four parts. The supply roll is conveniently mounted in frame 1. The heating, embossing, and initial cooling rolls are preferably mounted in a frame 5. A separate frame 21 is conveniently provided to carry the series of cooling rolls which may consist of any desired number, depending to some extent upon the thickness of film embossed and to some extent upon its heat capacity, since it is desirable that the film should be completely cooled before it is re-reeled. The re-reeling or winding mechanism is conveniently carried in a frame 29 which may support one end of the cooling frame 21 while the other end of the frame 21 is supported by the frame 5. It is usually desirable that all of the rolls be driven either by a gear, or chain, or belt except the floating roll 24. It may be noted that as a general rule the strength of the film is not sufficient to cause any of the rolls to revolve except the roll 24, which preferably is made of a very thin, light tubing with no bearings other than guide bars, as shown, to permit free up and down movement. (The floating roll 24 may if desired be caused to actuate a friction drive on the rewind roll 28 so as to give a constant peripheral speed and vary the R. P. M. according to the diameter of the roll.)

In the process of the present invention, the plastic material is polymerized in the usual way and sheeted out upon standard smooth sheeting rolls. The preferred material is a vinyl plastic such as polyvinyl chloride or polyvinyl alcohol or the polyvinyl acrylate compounds or the like. However, any of the thermoplastic high polymers which are sufficiently plastic to be sheeted out may be used for the present invention. These materials are preferably reeled or spooled into a substantial sized roll weighing from 10 to 100 or more pounds, depending upon the thickness of the sheet in the roll.

The roll of sheet plastic then is placed on the rolls 2 as shown in Fig. 1 and the outer end passed over the feed roll 4 and around the stretching and heating rolls 5, 6, 7, 8, and 9. The heating rolls are preferably brought up to temperature first and the sheet plastic rapidly threaded over them and fed to the bite between the engraved roll 12 and the pressure roll 14. The rolls are then put into rotation and the sheet plastic is drawn off of the roll 3 and heated by the rolls 5, 6, 7, 8, and 9 to a temperature which is a small number of degrees below the softening point of the plastic. For vinyl chloride or mixed vinyl chloride-vinyl alcohol polymers, this temperature usually lies within the range between about 200° F. and 275° F.

Simultaneously with the heating of the film, a stretching action is provided by a progressive increase in the peripheral speed of the successive rolls. It appears that the stretching is quite important, since the stretching yields the very unexpected improvement of a very much sharper transfer of the pattern from the intaglio roll. About the minimum useful amount of stretch is 2 per cent, which is adequate for 2 mil to 3 mil thick films, and the maximum amount is about 30 per cent, which is not too much for very thick plastic films of 25 mils to 35 mils. The preferred stretch is 10 per cent, which is not too much for 2 mil or 3 mil sheets (more stretch on very thin films puts pinholes in them, and tends to tear them) and is sufficient for the thickest films, to ensure good acceptance of the pattern.

The warm plastic film is then delivered as promptly as feasible to the bite between the rolls 12 and 14. The fact that the roll 12 is cold yields an immediate surface chill on the plastic sheet producing a hard surface on a relatively soft body. The chilled surface backed by a soft cover 15 of the pressure roll 14 permits the surface of the plastic sheet to follow the contours of the roll while the soft body of the plastic sheet flows sufficiently to force the chilled surface against the engraved roll surface. At the same time, however, the sheet surface, although slightly chilled, is still sufficiently plastic to stretch into and over the contours of the engraving on the embossing roll thereby producing a smooth back surface and maintaining the sharp contours from the engraved roll 12.

It is found that good operating practice requires that the sheet plastic adhere to the embossing roll for a substantial time after it has left the bite between the rolls 12 and 14, and the primary operating criterion in the process to distinguish between good embossing and poor embossing is the adhesion of the embossed film to the surface of the engraved roll for a time of travel of one-quarter to one-third of the roll periphery. The nature of this adhesion is not at the present time known. It may be due in part to atmospheric pressure since air is quite completely squeezed out from between the film surface and the engraved roll. It may be due in part to electrostatic attraction, since there are definitely considerable amounts of static electricity generated during the process. It may be due in part also to adhesivity between the roll and the plastic since at elevated temperatures the plastic is definitely slightly sticky; or it may be due to cohesion of some type. In any event, if the film does not stick to the roll but falls away immediately onto the bottom roll the embossing tends as a rule to be poor, and if the sheet tends to stick to the engraved roll for more than about a half revolution the sheet tends to wrap itself around the embossing roll and clog the rolls.

The sheet is then stripped from the embossing roll by the out-put rolls 16 and 17 and its direction of travel is reversed by the first cooling roll 18. The film is then led over a series of cooling rolls 19, 22, and 23 to bring its temperature down to room temperature and it is then re-wound by any convenient means, whereupon it is found to have a sharp, clean embossing upon the surface following accurately the intaglio engraving of the embossing roll.

It will be observed that the heating is critical, and that the sheet must be heated with care. The temperature must not be so high that the sheet loses all of its tensile strength and melts, since there must be sufficient tensile strength retained to permit it to be drawn over the several rollers; and it must be sufficient to take out the springiness and make the material truly plastic.

Thus, the process of the invention simultaneously warms and stretches a sheet of thermoplastic material, and brings the temperature to a small number of degrees below the softening point of the plastic, the temperature usually being from 2° to 10° below the stated softening point and the stretch usually ranging between 2 per cent and 25 per cent of the length. The warm stretched sheet is then delivered quickly to the bite between a cold embossing roll and a pressure roll, which may have a soft surface or may be engraved, as desired, the temperature of the film as delivered to the embossing roll being adjusted to such a value that the embossed film will cling to the roll over approximately one-quarter to one-third of its periphery. The embossed film is then stripped from the embossing roll, cooled, and rewound on a roll for shipment to the user.

While there are above disclosed but a limited number of embodiments of the process of the present invention it is possible to provide still other embodiments without departing from the inventive concept herein disclosed, and it is therefore desired that only such limitations be imposed on the appended claims as are stated therein or required by the prior art.

The invention claimed is:

1. An embossing process comprising the steps, in combination, of simultaneously warming to a temperature slightly below the softening point and stretching a thermoplastic sheet lengthwise, passing the said sheet through the bite between a cold engraved roll and a pressure roll, and thereafter stripping the sheet from the engraved roll and cooling it to room temperature.

2. An embossing process comprising the steps, in combination, of drawing sheet plastic having a thickness within the range between 1 mil and 30 mils from a roll, heating the withdrawn sheet of plastic to a temperature within the range of about 2° to 10° Fahrenheit below its softening point, simultaneously stretching the warm sheet by from 5 per cent to 30 per cent of its length, and delivering the warm stretched film to a cold embossing roll.

3. An embossing process comprising the steps, in combination, of drawing sheet plastic having a thickness within the range between 1 mil and 30 mils from a roll, heating the withdrawn sheet of plastic to a temperature within the range of about 2° to 10° Fahrenheit below its softening point, simultaneously stretching the warm sheet by from 5 per cent to 30 per cent of its length, and delivering the warm stretched film to the bite between a cold engraved roll and a pressure roll.

4. An embossing process comprising the steps, in combination, of drawing sheet plastic having a thickness within the range between 1 mil and 30 mils from a roll, heating the withdrawn sheet of plastic to a temperature within the range of about 2° to 10° Fahrenheit below its softening point, simultaneously stretching the warm sheet by from 5 per cent to 30 per cent of its length, and delivering the warm stretched film to the bite between a cold engraved roll and a pressure roll, the temperature of the film being adjusted to such a value that the embossed film will cling briefly to the engraved roll.

5. An embossing process comprising the steps, in combination, of drawing sheet plastic having a thickness within the range between 1 mil and 30 mils from a roll, heating the withdrawn sheet of plastic to a temperature within the range of about 2° to 10° Fahrenheit below its softening point, simultaneously stretching the warm sheet by from 5 per cent to 30 per cent of its length, delivering the warm stretched film to the bite between a cold engraved roll and a pressure roll, the temperature of the film being adjusted to such a value that the embossed film will cling briefly to the engraved roll, and thereafter stripping the embossed film from the engraved roll and cooling it to room temperature.

References Cited in the file of this patent

UNITED STATES PATENTS

| Number | Name | Date |
|---|---|---|
| 1,921,456 | DeLaney | Aug. 8, 1933 |
| 2,030,066 | Jenett | Feb. 11, 1936 |
| 2,070,023 | Olsen | Feb. 9, 1937 |
| 2,269,521 | Darrah | Jan. 13, 1942 |
| 2,321,047 | Salzberg | June 8, 1943 |
| 2,323,862 | Zimmerman et al. | July 6, 1943 |
| 2,490,781 | Cloud | Dec. 13, 1949 |
| 2,585,915 | Chavannes | Feb. 19, 1952 |